United States Patent [19]

Berthold, III et al.

[11] Patent Number: 4,536,827

[45] Date of Patent: Aug. 20, 1985

[54] IMAGE COLLECTION AND OBJECT ILLUMINATION

[75] Inventors: John W. Berthold, III, Salem, Ohio; Charles S. Fitzgerald, Brookfield, Conn.

[73] Assignee: The Babcock & Wilcox Company, New Orleans, La.

[21] Appl. No.: 575,259

[22] Filed: Jan. 30, 1984

[51] Int. Cl.³ ............................................. F21V 7/04
[52] U.S. Cl. ................................. 362/32; 362/267; 362/308; 362/310; 362/328; 362/331; 362/335; 362/347
[58] Field of Search ............... 362/32, 267, 308, 310, 362/328, 331, 335, 347

[56] References Cited

U.S. PATENT DOCUMENTS 4,420,796 12/1983 Mori .................................. 362/32

Primary Examiner—Stephen J. Lechert, Jr.
Attorney, Agent, or Firm—Vytas R. Matas; Robert J. Edwards

[57] ABSTRACT

A probe for inspecting the inner surface of a tube is disclosed. The probe (10) utilizes a group of large diameter optical fibers (12) as a light source and an annular ring (14) of smaller diameter optical fibers as interceptors of the reflected light. A pair of plano-convex lenses (16) focuses the light beam emanating from the group of large diameter optical fibers (12) onto a reflective ball bearing (18) or a concave cone (32) causing a circumferential band (44) to be illuminated on the inner surface of the tube. Light from the band (44) is intercepted by the optical fibers within the annular ring (14) and is transmitted therethrough. The transfer of light from the band (44) to the annular ring (14) is optimized by beveling the end of the optical fibers within the annular ring (14).

17 Claims, 5 Drawing Figures

IMAGE COLLECTION AND OBJECT ILLUMINATION

TECHNICAL FIELD

This invention generally relates to a device for inspecting the inner surface of a tube, and more particularly to a device which utilizes optical fibers for such inspection.

BACKGROUND ART

The inner surfaces of tubes, such as steam generator tubes, are usually inspected by means of a mechanical probe having a plurality of spring loaded feelers attached thereto. By monitoring the deflections of the springs through the use of strain gages mounted on the feelers, deposits and/or obstructions within the tube can be determined. However, inasmuch as only a relatively small number of feelers can be utilized due to space limitations and these feelers are in a spaced apart relationship, inspection of the entire inner periphery of the tube cannot be accomplished. In addition, since the feelers contact the inner surface of the tube and are spring loaded, there is always the risk of damaging extremely fragile tubes during such inspection. And lastly, the use of such a mechanical type probe does not permit the user to actually view the deposits and/or obstructions within the tube being inspected.

Because of the foregoing, it has become desirable to develop a non-contact inspection probe which allows the user to visually inspect the entire inner periphery of a tube.

SUMMARY OF THE INVENTION

The present invention solves the aforementioned problems associated with the prior art as well as other problems by utilizing optical fibers in a non-contact probe assembly. The probe assembly includes an inner core of optical fibers which act as the light source, an annular ring of optical fibers which surrounds the inner core of optical fibers and intercepts the reflected light, a pair of plano-convex lenses which focuses both the light beam emanating from the inner core of optical fibers and the reflected light beam so that it can be intercepted by the annular ring of optical fibers, and a target in the form of a reflective ball bearing or a concave cone. The light reflected by the reflective ball bearing or the concave cone causes the illumination of a circumferential band on the inner surface of the tube. The light from this band is transmitted to the annular ring of optical fibers so that a visual inspection of the inner surface of the tube can be made. The ends of the optical fibers comprising the annular ring are beveled at a predetermined angle to optimize the transfer of light from the circumferential band to the optical fibers within the annular ring.

DESCRIPTION OF THE PREFERRED EMBODIMENT

Figure 1:
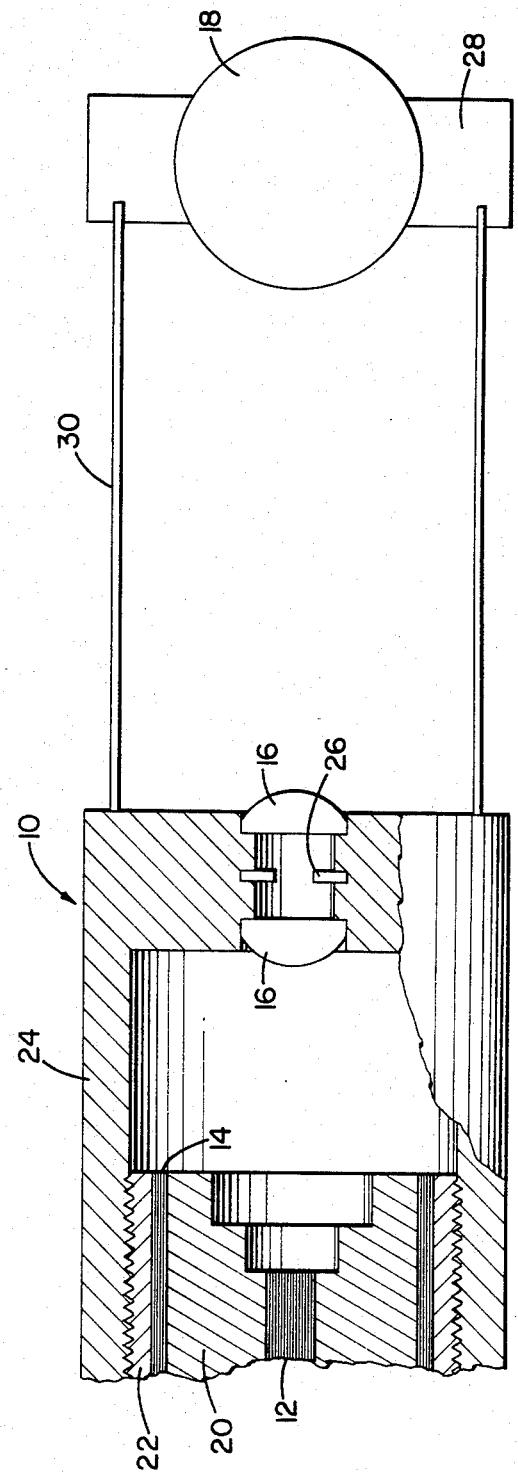
FIG. 1 is a front plan view, partially broken away in cross-section, illustrating the present invention.

Referring now to the drawings where the illustrations are for the purpose of describing the preferred embodiment of the present invention and are not intended to limit the invention hereto, FIG. 1 is a cross-sectional view of a first embodiment of the invention and illustrates a probe assembly 10. This assembly 10 is comprised primarily of a group of large diameter optical fibers 12 which form the central portion of the assembly, an annular ring 14 of smaller diameter optical fibers which is concentric with the large diameter optical fiber group 12, a pair of plano-convex lenses 16, and a reflective ball bearing 18 held in a spaced apart relationship from the pair of lenses 16 and the optical fibers 12 and 14.

The group of large diameter optical fibers 12 acts as the light source and is comprised of approximately 37 fibers each having a clad diameter of approximately 0.008 inch. A coaxial spacer 20 surrounds the large diameter optical fiber group 12 and is interposed between this optical fiber group 12 and the annular ring 14 of smaller diameter optical fibers. In this manner, the annular ring 14 of smaller diameter optical fibers and the large diameter optical fiber group 12 are held in a concentric relationship. The annular ring 14 of smaller diameter optical fibers acts as an interceptor of light reflected by the ball bearing 18 and is comprised of approximately 1500 fibers each having a clad diameter of approximately 0.0015 inch and a core diameter of approximately 0.00075 inch. Both the large diameter optical fiber group 12 and the annular ring 14 of smaller diameter optical fibers are bifurcated to facilitate the introduction of light at the input end of large diameter optical fiber group 12 and the collection of light at the output end of the annular ring 14 of smaller diameter optical fibers. In addition, the end of large diameter fiber group 12 is recessed in the coaxial spacer 20 so as to separate the light transmitted by the large diameter fiber group 12 from that reflected to and collected by the annular ring 14 of smaller diameter optical fibers.

A tubular sleeve 22 is received over the assembly of the large diameter optical fiber group 12, the coaxial spacer 20, and the annular ring 14 of the smaller diameter optical fibers. This tubular sleeve 22 is, in turn, threadably received in a collar nut 24 which retains the pair of plano-convex lenses 16 in a spaced apart relationship with respect to each other and with respect to the end of the large diameter optical fiber group 12 and the annular ring 14 of smaller diameter optical fibers.

The arrangement of the pair of plano-convex lenses 16 is a variation of the classic wide-angle configuration. Each plano-convex lens has a focal length of approximately 6 mm giving an effective focal length of approximately 4.2 mm for the combination of lenses. An aperture 26 having a diameter of approximately 2 mm is interposed between the lenses giving an f-stop of approximately 2 for the overall lens arrangement.

Figure 2:
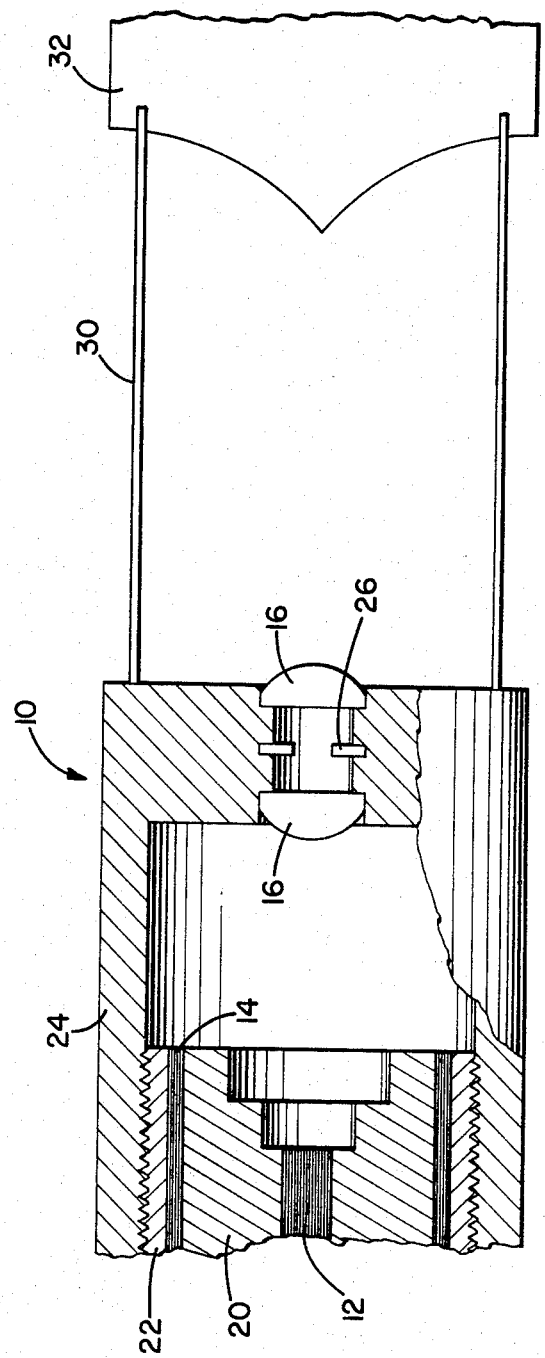
FIG. 2 is an alternate embodiment of the invention illustrated in FIG. 1.

The reflective ball bearing 18 is retained within a mounting block 28 which is held in a spaced apart relationship with the pair of plano-convex lenses 16 by means of a plurality of thin wires 30 which minimize the blockage of light and maximize the passage of light therebetween. In this manner, the pair of plano-convex lenses 16 is interposed between the reflective ball bearing 18 and the assembly comprising the large diameter optical fiber group 12 and the annular ring 14 of smaller diameter optical fibers. In an alternate embodiment, as shown in FIG. 2, the reflective ball bearing 18 and its associated mounting block 26 are replaced by concave cone 32 having a configuration as indicated.

Figure 3:
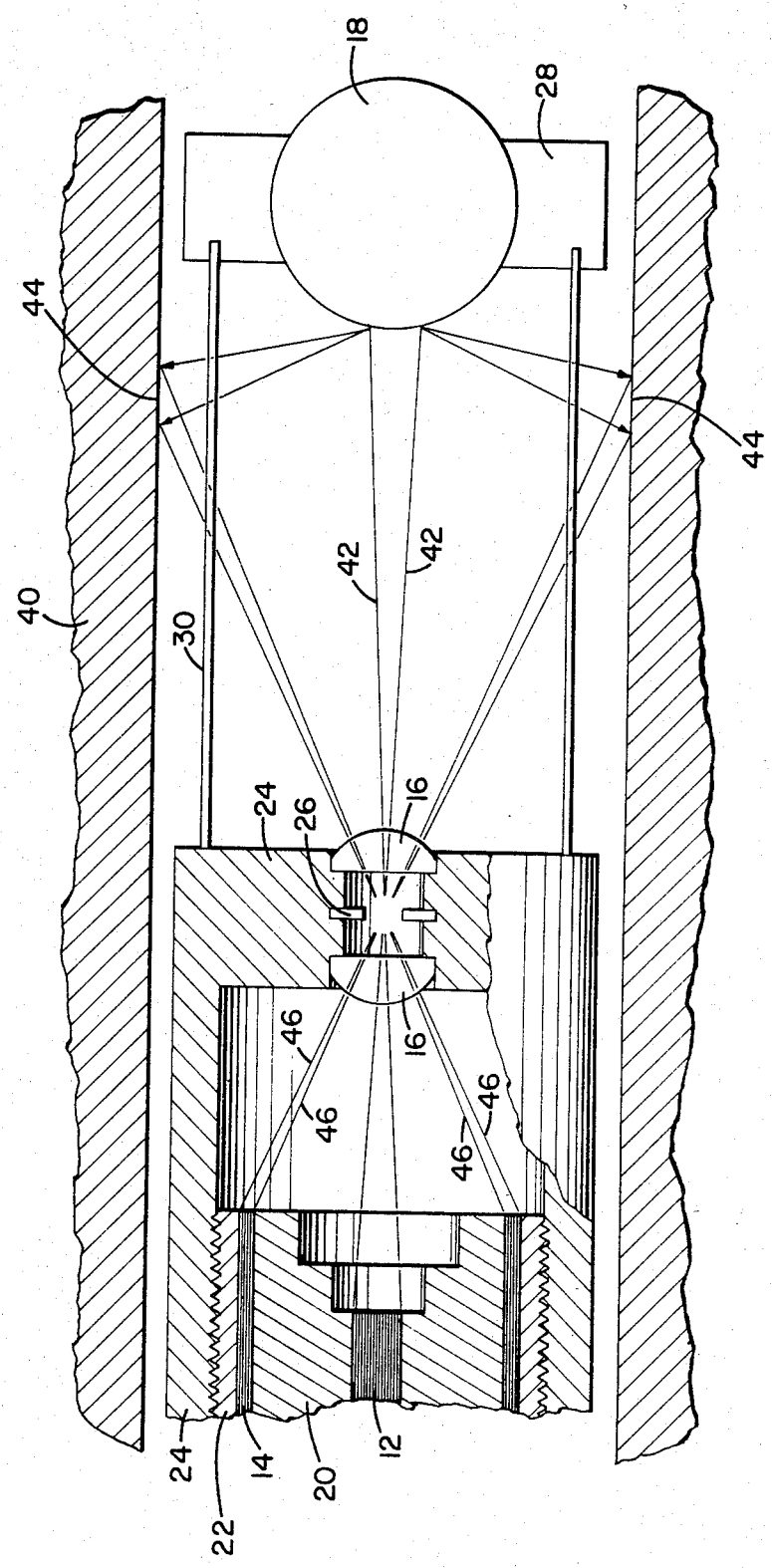
FIG. 3 is a front plan view of the invention when inserted in a tube to be inspected.

Either of the aforementioned embodiments can be used to illuminate the interior of a tube, such as a steam generator tube. To accomplish such illumination, the probe assembly 10 is inserted into the tube 40 to be illuminated, as illustrated in FIG. 3. A light source (not shown) is then directed toward the end of the large diameter optical fiber group 12 causing a beam of light to be transmitted therethrough and to emanate therefrom. The resulting diverging light beam, shown generally by the numeral 42, is focused by the pair of plano-convex lenses 16 and the aperture 26 to an image plane in front of the reflective ball bearing 18 or the concave cone 32. The light striking the ball bearing 18 or the concave cone 32 is then reflected so as to illuminate a circumferential band, shown generally by the numeral 44, on the interior surface of the tube 40. The width of the circumferential band 44 is dependent upon the relative dimensions between the components within the probe assembly 10. However, peak illumination intensity within the circumferential band 44 occurs approximately at the location of the object plane of the pair of plano-convex lenses 16.

The reflected light emanating from the circumferential band 44 is then focused by the pair of plano-convex lenses 16 and the aperture 26 located therebetween into a light beam, shown generally by the numeral 46, which is intercepted by the end of the annular ring 14 of smaller diameter optical fibers. These smaller diameter optical fibers then transmit this light from the circumferential band to detectors or viewing devices (not shown) so that the condition of the interior surface of the tube can be determined.

Figure 4:
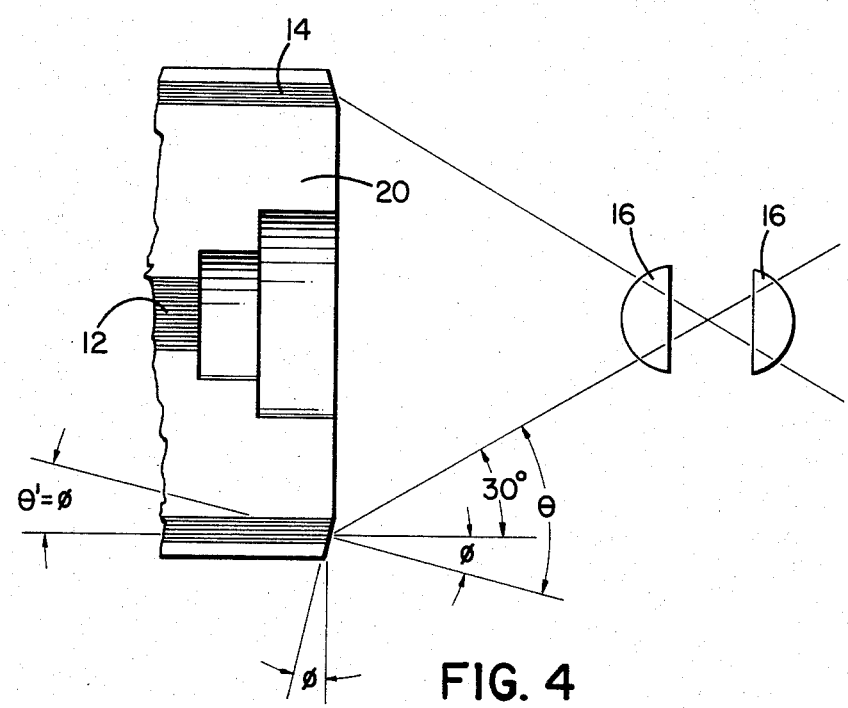
FIG. 4 is an enlarged front plan view illustrating the beveling of the ends of the optical fibers comprising the annular ring which intercepts the reflected light.

By experimentation, it has been determined that the median image field angle, i.e., the angle of the reflected light beam 46 with respect to the horizontal is approximately 30°, as illustrated in FIG. 4. At this angle, only 0.4% of the light which passes through the aperture 26 enters the smaller diameter optical fibers in the annular ring 14. Thus, the coupling of light from the tube wall into the fibers in the annular ring 14 is very inefficient. It has been found that this coupling efficiency can be increased by beveling the ends of the fibers in the annular ring 14, as shown in FIG. 4. Such beveling allows the reflected light beam from the tube wall to be transmitted through the fibers comprising the annular ring 14 in a direction parallel to their respective axes. In this manner, optimum coupling efficiency is achieved.

Figure 5:
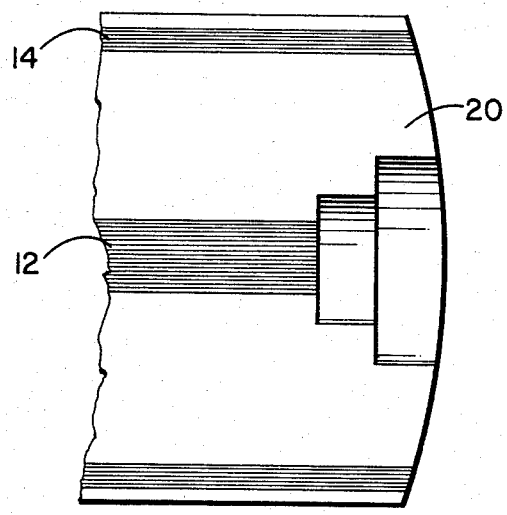
FIG. 5 is an enlarged front plan view illustrating the beveling of the ends of the optical fibers comprising the annular ring by grinding a convex surface on the end of the annular ring.

Referring now to FIG. 5, an enlarged view of the fiber end of the probe assembly 10 is illustrated. From Snell's law, it can be determined that $$\sin[30° + \phi] = n \sin \theta' = n \sin \phi$$

where n = 1.5, the index of refraction of the glass constituting the small diameter optical fibers in the annular ring 14. Solving the foregoing equation for $\phi$, the bevel angle, results in $$\phi \approx 38°$$

Thus, optimum coupling efficiency occurs where the angle of the bevel applied to the ends of the smaller diameter fibers comprising the annular ring 14 is approximately 38°. It has been experimentally determined that the coupling efficiency from image to fiber is increased by greater than 100 times by the application of the foregoing bevel to the end of the annular ring 14. In addition, it has been found that one approach for obtaining a circularly symmetrical bevel is to grind a convex surface of a predetermined radius on the end of the annular ring 14, as shown in FIG. 5. The radius of the foregoing convex surface is dependent upon the overall width of the probe assembly 10. It should be noted that other approaches can be utilized for applying a symmetrical bevel onto the end of the annular ring 14, however, it has been determined that grinding a convex surface of a predetermined radius yields excellent results in an expeditious manner.

Certain modifications and improvements will occur to those skilled in the art upon reading the foregoing. It should be understood that all such modifications and improvements have been deleted herein for the sake of conciseness and readability, but are properly within the scope of the following claims.

We claim:

1. A device for remotely inspecting the inner surface of a tubular object comprising means for transmitting a beam of light into the tubular object, a target to reflect said light beam onto the inner surface of the tubular object producing a circumferential band of illumination on the inner surface of the tubular object, and annular means for intercepting the light emanating from said circumferential illumination band to provide a remote display of the inner surface of the tubular object.

2. The device as defined in claim 1 wherein said means for transmitting a beam of light into the tubular object comprises a first group of optical fibers.

3. The device as defined in claim 1 wherein said means for intercepting the light emanating from said circumferential illumination band comprises a second group of optical fibers.

4. The device as defined in claim 1 wherein said means for transmitting a beam of light into the tubular object comprises a first group of optical fibers and wherein said means for intercepting the light emanating from said circumferential illumination band comprises a second group of optical fibers, the optical fibers comprising said second optical fiber group being positioned in an annular ring arrangement for receipt of said first optical fiber group therein.

5. The device as defined in claim 4 further including spacer means interposed being said first optical fiber group and said annular ring arrangement of said second optical fiber group, said spacer means causing said annular ring arrangement of said second optical fiber group to be in a concentric relationship with said first optical fiber group.

6. The device as defined in claim 3 wherein the light beam transmitting end of said first optical fiber group is recessed relative to the light beam intercepting end of said annular ring arrangement of said second optical fiber group.

7. The device as defined in claim 3 wherein the light beam intercepting end of said annular ring arrangement of said second optical fiber group is beveled at a predetermined angle to optimize the transfer of light from said circumferential illumination band to said second group of optical fibers comprising said annular ring arrangement.

8. The device as defined in claim 7 wherein said beveling of said light beam intercepting end of said annular ring arrangement is approximated by forming a convex surface of a predetermined radius on said light beam intercepting end of said annular ring arrangement.

9. The device as defined in claim 3 wherein the number of optical fibers comprising said second group of optical fibers is greater than the number of optical fibers comprising said first group of optical fibers.

10. The device as defined in claim 3 wherein the diameter of the optical fibers comprising said first group of optical fibers is greater than the diameter of the optical fibers comprising said second group of optical fibers.

11. The device as defined in claim 1 further including means for focusing said light beam emanating from said transmitting means onto said target and for focusing said light emanating from said circumferential illumination band toward said intercepting means.

12. The device as defined in claim 11 wherein said focusing means is interposed between said transmitting means and said target.

13. The device as defined in claim 11 wherein said focusing means is interposed between said target and said intercepting means.

14. The device as defined in claim 11 wherein said focusing means comprises a pair of plano-convex lenses.

15. The device as defined in claim 14 further including an aperture arrangement positioned between said pair of plano-convex lenses.

16. The device as defined in claim 1 wherein said target is a reflective ball bearing member.

17. The device as defined in claim 1 wherein said target is a cone having a concave configuration.

* * * * *